Patented May 18, 1954

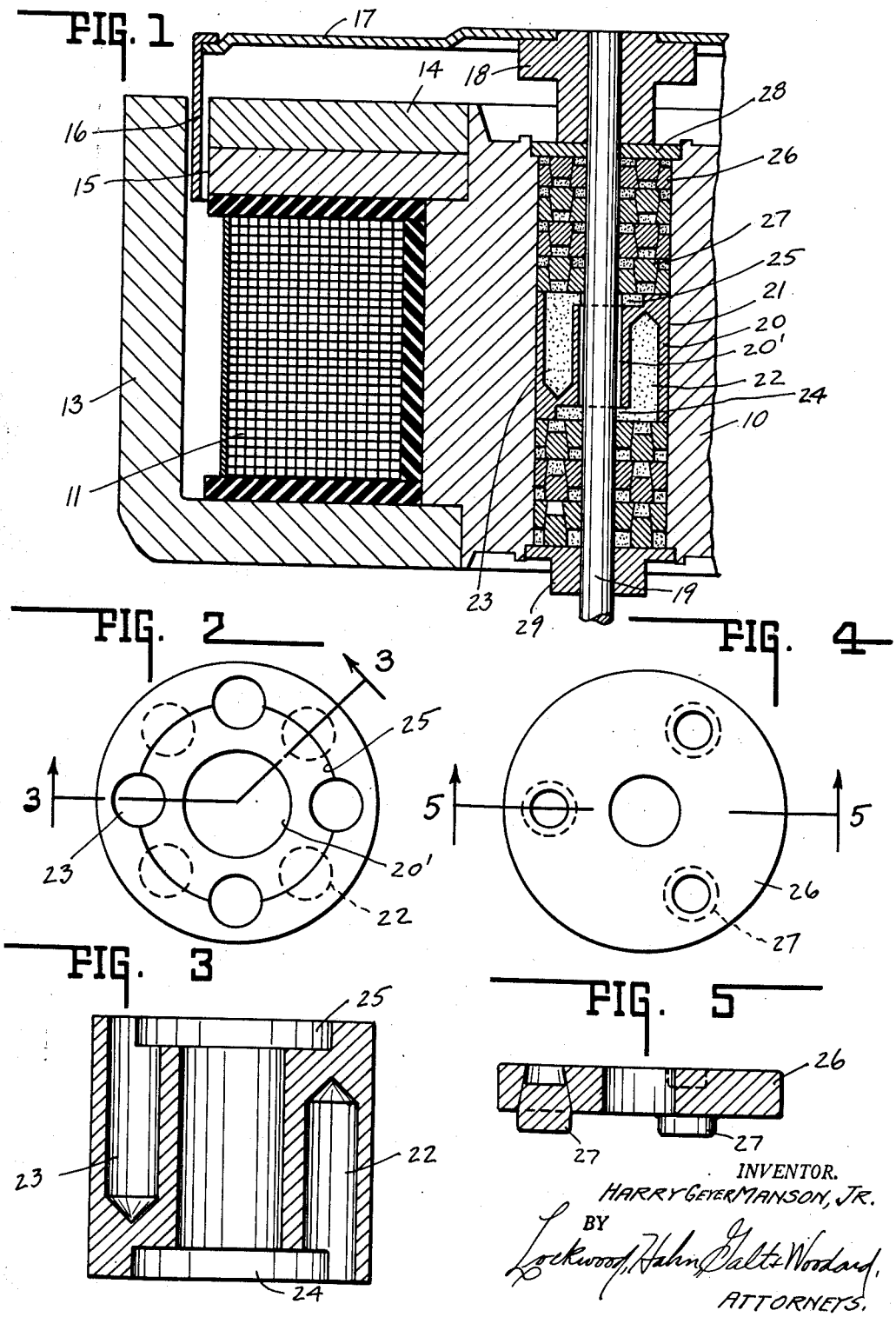

2,678,855

UNITED STATES PATENT OFFICE 2,678,855

SELF-LUBRICATING SHAFT BEARING

Harry Geyer Manson, Jr., Princeton, Ind., assignor to Hansen Manufacturing Company, Inc., Princeton, Ind., a corporation Application March 15, 1951, Serial No. 215,687

7 Claims. (Cl. 308—121)

1

The present invention relates to improvements in self-lubricating shaft bearings, and particularly to that type of bearing wherein there is provided a liquid lubricating medium in the form of oil or the like for the lubrication of the bearing surface of a shaft and the bearings.

It is one of the objects of my invention to provide means for constantly providing a fluid lubricant to the bearing surfaces, as these surfaces tend to become "dry" with a rotation of the shaft therein.

It is a further object of my invention to provide such lubricant only as needed, without danger of the lubricant unrestrainedly thawing out of the supply means.

It is a still further object of my invention to provide a reserve of supply lubricant, which reserve of lubricant will automatically feed lubricant to the supply means, as the lubricant tends to become exhausted therefrom.

My invention is particularly adapted for the lubrication of the bearings of a structure wherein the shaft operates in a vertical position, and more specifically the invention is adapted for lubricating the shafts of small electric motors of the type adapted to operate electrically driven clocks and other timing instruments. Such motors are so constructed and disposed in operating positions that after assembly and placed in position, further lubrication is practically impossible. Furthermore, such motors are intended to and do operate practically continuously, and practically indefinitely, and at the same time must maintain a substantially constant speed.

For the purpose of disclosing my invention, I have illustrated an embodiment thereof in the accompanying drawings in which:

Fig. 1 is a longitudinal sectional view of my improved bearing, and so much of an electric clock motor as is necessary for an understanding of my invention.

Fig. 2 is a plan view of the oil reservoir of my invention.

Fig. 3 is a longitudinal sectional view taken on the line 3—3 of Fig. 2.

Fig. 4 is a plan view of one of the bearing members, and

Fig. 5 is a sectional view on the line 5—5 of Fig. 4.

In the specific embodiment of the invention illustrated, bearing sleeve 10 constitutes a soft iron core for an electric motor, encircled by a field winding 11. This core has its ends reduced in diameter and receives a disc-shaped pole piece having at its periphery axially disposed poles 13.

2

The opposite end of the core or sleeve 10 receives a pair of disc-shaped pole pieces 14 having radial poles 15, the outer ends of which lie in close proximity to but spaced apart from the poles 13. In the space between the outer poles 13 and the inner poles 15 is adapted to rotate an annular skirt 16 of a rotor 17, which in turn is secured on a hub 18 carried on the end of the shaft 19. This shaft extends through the core 10 and is mounted in bearings located in the center of the core.

The bearing structure comprises an oil reservoir 20, which is cylindrical in shape and of a diameter to closely fit into the center opening 21 of the core 10. The reservoir 20 is centrally bored at 20' to accommodate the shaft 19, and this bore, it will be noted, is sufficiently large in diameter to provide a clearance between the walls of the bore and the shaft 19. The reservoir 20 is provided with oil or other lubricant containers 22 and 23, which are drilled axially in the reservoir from opposite ends and arranged alternately. Containers 22 terminate in a channel 24 extending to the center of the bore 20 and container 23 terminates in channel 25, likewise extending to the bore 20.

Stacked above and below the reservoir 20 are bearings. Each of these bearings constitutes a disc 26, preferably formed of Babbitt metal, and of a diameter to closely fit the opening 21 in the core 10. Concentrically disposed on the disc are lugs or spacers 27. These spacers are preferably formed from the disc in a die press. The die of the press is slightly larger than the punch, and by stopping the punch short of a clear passage, and due to the construction of the die and punch, the protruding portion of the spacer forming the spacer lugs, is slightly larger than the shank thereof and the opening in the top of the disc. As a result, there is no danger of one spacer slipping into the opening formed in the top of the next disc below.

In assembly, the reservoir 20 is first introduced into the center opening 21 of the core 10 at about the center thereof. The bearing discs 26 are then stacked one above the other in the opening 21 with the flat faces of the discs on either side of the reservoir lying adjacent to and upon the upper and longer faces of the reservoir. Due to the spacing of the discs 26 there are provided between the discs finite lubricant receiving cells adapted to receive and contain a lubricant for the bearings provided by the bearing discs.

After the discs have been assembled, a vacuum or partial vacuum is drawn in the opening 21, and the lubricant is introduced under this vacuum. As a result, lubricant completely fills the containers in the reservoir and the space between the bearing disc 26, being prevented from flowing therefrom due to the fact there is no opportunity for the air to filter behind the lubricant film to equalize the pressures on the opposite sides of the oil film. The opening is then closed at one end by a rotor thrust washer 28 and by a bearing cap 29 at the other end.

During long and continuous operation of the motor there will occur a slight loss of lubricant from the cells. This lost lubricant will be replaced, however, from the containers 22 and 23. The oil will pass out of the containers by way of passages 24 and 25, and will be carried along the shaft 19 by capillary attraction to replace that lost from the cells.

The invention claimed is:

1. A self-lubricating bearing for shafts comprising a bearing sleeve having a shaft receiving opening therein, a plurality of bearing members disposed in said opening and spaced apart to provide therebetween finite lubricant receiving cells communicating with the bearing surfaces of said bearing members, and a lubricant reservoir disposed in said shaft receiving opening having a shaft receiving opening therethrough and a lubricant container therein communicating with said shaft receiving opening.

2. A self-lubricating bearing for shafts comprising a bearing sleeve having a shaft receiving opening therein, a plurality of bearings disposed in said sleeve in stacked relation each comprising a bearing disc having a shaft receiving opening formed centrally thereof, means for supporting said discs in spaced relation to provide therebetween finite lubricant receiving cells communicating with the bearing surfaces of said discs, and a reservoir disposed within said sleeve having a lubricant container therein communicating with said lubricant receiving cells.

3. A self-lubricating bearing for shafts comprising a bearing sleeve having a shaft receiving opening therein, a lubricant reservoir having a shaft passage opening therein disposed in said sleeve and having axially disposed lubricant containers, each communicating with the shaft passage opening of said reservoir, a plurality of bearing discs disposed in stacked relation on opposite sides of said reservoir, means for maintaining said discs in spaced relation to one another to provide therebetween finite lubricant containing cells communicating with the bearing surfaces of said discs.

4. A self-lubricating bearing for shafts comprising a bearing sleeve having imperforate walls, a lubricant reservoir mounted within, and between the ends of, said sleeve and including a lubricant container having an opening for feeding lubricant along a shaft, and shaft bearings mounted in said sleeve between each end thereof and said reservoir, said bearings comprising finite lubricant receiving cells communicating with the bearing surfaces of said bearings.

5. A self-lubricating bearing for shafts comprising a bearing sleeve having imperforate walls, a lubricant reservoir mounted within, and between the ends of, said sleeve and including lubricant containers, one of said containers having an opening for feeding lubricant along a shaft toward one end of said sleeve and the other of said containers having an opening for feeding lubricant along a shaft toward the other end of said sleeve, and shaft bearings mounted in said sleeve between each end thereof and said reservoir, said bearings comprising finite lubricant receiving cells communicating with the bearing surfaces of said bearings for providing a plurality of lubricant seals on said shaft.

6. A self-lubricating bearing for shafts comprising a bearing sleeve having imperforate walls, a lubricant reservoir mounted within, and between the ends of, said sleeve and including lubricant containers, some of said containers having openings for feeding lubricant along a shaft toward one end of said sleeve and others of said containers having openings for feeding lubricant along a shaft toward the other end of said sleeve, and shaft bearings mounted in said sleeve between each end thereof and said reservoir for providing an air sealing lubricant film on said shaft.

7. A self-lubricating bearing for shafts comprising a bearing sleeve having imperforate walls, a lubricant reservoir mounted within, and between the ends of, said sleeve and including lubricant containers, some of said containers having openings for feeding lubricant along a shaft toward one end of said sleeve and others of said containers having openings for feeding lubricant along a shaft toward the other end of said sleeve, and shaft bearings mounted in said sleeve between each end thereof and said reservoir for providing an air sealing lubricant film on said shaft, said bearings comprising finite lubricant receiving cells communicating with the bearing surfaces of said bearings for providing a plurality of lubricant seals on said shaft.

References Cited in the file of this patent

UNITED STATES PATENTS

| Number | Name | Date |
|---|---|---|
| 21,474 | Thayer | Sept. 7, 1858 |
| 301,412 | Ulffers | July 1, 1884 |
| 1,345,534 | Crane | July 6, 1920 |
| 1,563,663 | Seabury | Dec. 1, 1925 |
| 2,219,388 | Hansen | Oct. 29, 1940 |
| 2,227,307 | Hildabolt | Dec. 31, 1940 |
| 2,494,023 | Williams | July 10, 1950 |
| 2,549,659 | Brendel | Apr. 17, 1951 |

FOREIGN PATENTS

| Number | Country | Date |
|---|---|---|
| 35,035 | Netherlands | Mar. 15, 1935 |
| 268,034 | Great Britain | Mar. 24, 1927 |
| 440,825 | Great Britain | Jan. 7, 1936 |
| 663,245 | Germany | Aug. 3, 1938 |